United States Patent Office 2,945,842
Patented July 19, 1960

2,945,842
SULFONATION OF FINELY DIVIDED POLYMERS WITH SULFONATION AGENTS IN GAS PHASE

Jacob Eichhorn and James M. Steinmetz, Midland, Mich., assignors to The Dow Chemical Company, Midland, Mich., a corporation of Delaware No Drawing. Filed Nov. 9, 1956, Ser. No. 621,215

5 Claims. (Cl. 260—79.3)

This invention relates to the preparation of resin polysulfonates by the sulfonation of resinous polymers. More particularly it pertains to an improved process of sulfonation wherein solid resinous polymers are sulfonated by contacting the same in finely divided form with a gas comprising a sulfonation agent, such as sulfur trioxide, and to certain unique products obtainable thereby.

It is known to sulfonate liquid solutions of polymers by reaction thereof with sulfonation agents in the presence of inert liquid reaction media. It is also known to sulfonate solid pieces of resinous polymer with sulfonation agents while having the reactants dispersed in an inert liquid reaction medium.

While commonly practiced, the known methods of sulfonation have certain objectionable aspects. The use of a liquid medium for the reaction creates problems in isolating the resin sulfonate product from the reaction mixture and in recovering the liquid medium for reuse. Where solutions are required, steps of storing and handling solute, solvent and solution are also required.

It is among the objects of this invention to provide improvements in the preparation of resin polysulfonates. A more specific object is to provide a method for the preparation of resin polysulfonates by sulfonation of resinous polymers in the absence of liquid reaction media. A still more specific object is to provide such a method wherein the resinous polymer in a solid state is contacted with a sulfonation agent in a gas state.

A further object is to provide unique resin sulfonates.

Still other objects and advantages of the invention will be evident in the following description.

The objects of this invention have been attained by contacting solid resinous polymers in finely divided form with a gas comprising at least one sulfonation agent, preferably sulfur trioxide, all as more fully set forth hereinafter.

It has now been discovered that resinous polymers can be uniformly and homogeneously sulfonated without employing a liquid reaction medium by contacting finely divided solid particles of a resinous polymer with a gas comprising sulfur trioxide or chlorosulfonic acid. Although these are vigorous sulfonation agents and the sulfonation reaction is rapid, the present process is readily controlled to produce a variety of useful products, some of which have unusual and advantageous properties.

The present process can be carried out with any solid resinous polymer susceptible of sulfonation and is particularly suitable for use with starting solid resinous polymers in whose molecular structure there is an appreciable proportion of aromatic nuclei, such as phenolic condensation products, cumarone-indene resins, and addition polymers of alkenyl-aromatic compounds. Exemplary of the latter are the polymerizates (homopolymers, copolymers, interpolymers and mixtures of polymers) of monoalkenylaromatic compounds such as styrene, α-methylstyrene, o-methylstyrene, m-methylstyrene, p-methylstyrene, α,ar-dimethylstyrene, ar,ar-dimethylstyrene, ethylstyrene and similar homologues of styrene, halostyrenes such as p-chlorostyrene, alkoxystyrenes such as m-methoxystyrene, other derivatives and analogues of styrene having one or more substituents particularly in the alpha- or nuclear positions, vinylnaphthalene, and polyalkenylaromatic compounds such as divinylbenzene and divinylnaphthalene. There can be employed copolymers, interpolymers, or mixtures of polymers of two or more of the foregoing alkenylaromatic compounds or of one or more of such alkenylaromatic compounds with one or more other polymerizable unsaturated compounds, for example, ethylenically unsaturated hydrocarbons such as ethylene, propylene, isobutylene, 1,3-butadiene, and isoprene, ethylenically unsaturated substituted hydrocarbons such as vinyl chloride, vinylidene chloride and chloroprene, ethylenically unsaturated esters such as vinyl acetate, methyl or ethyl acrylate, and methyl or ethyl methacrylate, acrylonitrile, methacrylonitrile, maleic anhydride, sulfur dioxide, methyl vinyl ketone, methyl isopropenyl ketone, vinylidene cyanide, and polyesters of ethylenically unsaturated polycarboxylic acids.

For the purposes of the present process it is essential that the solid resinous polymer be in the form of particles whose diameters are not more than 25 microns and are preferably less than 10 microns. Particles of resinous polymer larger than 25 microns are less uniformly and homogeneously sulfonated by the present method than are the smaller particles.

The fine particles of resinous polymer needed for this process can be obtained by known means such as attrition or grinding. In some instances, finely divided solid resinous polymer particles can be obtained by spray-drying aqueous colloidal dispersions thereof or by atomization and evaporation of solvent from solutions thereof. Aqueous colloidal dispersions of particles of polymer solids are commonly obtained by the so-called "emulsion polymerization" of the corresponding monomers, the resulting polymer particles having diameters in the order of one micron or less.

The sulfonation agent required in the present process is at least one of the group consisting of sulfur trioxide and chlorosulfonic acid, and, when brought into contact with the resinous polymer starting material, the sulfonation agent must be in a gaseous state. In some instances vapors of sulfur trioxide or of chlorosulfonic acid alone are used, but more commonly the sulfur trioxide or chlorosulfonic acid vapor is diluted with an inert gas or vapor to provide a gas mixture comprising the sulfonation agent. Suitable inert gases from which such mixtures can be prepared are, for example, sulfur dioxide, nitrogen, air, carbon dioxide and the noble gases. The gases should, of course, be anhydrous. The gas mixture can be made to contain any desired proportion of ingredients, from those that contain a mere trace of sulfonation agent to a gas that consists essentially of the sulfonation agent.

The invention is practiced by contacting finely divided dry solid particles of a resinous polymer with a gas comprising the sulfonation agent, bringing the reactants together in any desired manner. For example, a gas comprising the sulfonation agent can be passed over or through a thin layer or bed of the polymer particles; such a shallow layer or bed of particles can be a static one, e.g. a quantity of particles in a tray or pan, or can be a moving bed, e.g. a quantity of particles of polymer on a moving belt, exposed to a gas atmosphere comprising the sulfonation agent. Deep beds of polymer particles can also be used by passing a gas stream comprising a sulfonation agent therethrough. Deep beds of polymer particles are preferably agitated, either mechanically or by the action of the gas stream, while being contacted with the sulfonation gas. The sulfonation reaction is advantageously carried out while maintaining a bed of finely divided solid particles of resinous polymer in a fluidized state by passage therethrough of a stream of the sulfonation gas. Continuous operation of deep bed sulfonation can be carried out with either concurrent or countercurrent flow of the starting materials, i.e. the finely divided solid particles of resinous polymer and the sulfonation gas containing vapors of sulfur trioxide and/or chlorosulfonic acid.

The process can be carried out at temperatures in the reaction zone in the range from −40° C. or below to 200° C. or above, but not above the decomposition temperature. For most purposes, the preferred temperature range is from 0° to 100° C. The reaction can be carried out at, above, or below atmospheric pressure. Obviously, in order that the sulfonation agent be in the gas state in the reaction zone, it is necessary to select the composition of the gas, and the temperature and pressure thereof, such that the gas is above the dew point of its constituents.

Catalysts for the sulfonation reaction can be supplied to the reaction mixture, e.g. by incorporating the catalyst in the solid particles of polymer or (in the instances of volatile catalysts) by incorporating the catalyst in the sulfonation gas.

Contact of the finely divided, dry solid particles of resinous polymers, of the kind hereinbefore set forth, with the sulfonation gas results in sulfonation of the resinous polymer. The course of the principal sulfonation reaction is the formation of sulfonic acid groups on the polymer molecules. A secondary and concurrent effect of the sulfonation is a cross-linking reaction probably involving formation of sulfone linkages between polymer molecules. The extent and proportion of these several reactions can be varied and controlled by selection of the starting polymer and by selection and control of the reaction conditions. In accordance with this process, resin sulfonates having a wide variety of properties can readily be obtained.

For some purposes a degree of sulfonation corresponding to a mere trace of sulfur in the polymer is desired and can be obtained hereby, while higher degrees of sulfonation of the polymer up to one or more sulfonate groups per aromatic nucleus in the polymer molecule are also readily obtainable. In general, lower concentrations of sulfonation agent in the starting gas composition, and/or lower temperatures in the reaction zone, and/or shorter times of contact between the polymer particles and the sulfonation gas lead to lower degrees of sulfonation whereas, conversely, higher concentrations of sulfonation agent in the starting gas composition, and/or higher temperatures in the reaction zone, and/or longer times of contact between the polymer particles and the sulfonation gas lead to higher degrees of sulfonation. Introduction of as little as 0.1 or less sulfonic acid group per molecule of monomer chemically combined in the resin can effect appreciable change in some of its properties, e.g. its wettability with water. Water-dispersible sulfonates, e.g. of non-crosslinked vinylbenzene resins, and cation exchange sulfonates, e.g. of cross-linked vinylbenzene resins, usually contain an average of from 0.5, preferably from 0.6, to 1.0 or more sulfonic acid group per molecule of monomer chemically combined in the resin.

Formation of sulfonic acid groups on resinous polymer molecules tends to make the sulfonated polymer more hydrophilic. In the case of starting polymers that are highly cross-linked, such as a polymerizate of divinylbenzene, even the highly sulfonated products are insoluble in water, usually only slightly swellable by water, and are particularly useful as cation exchange resins. In the case of starting polymers that are substantially linear, such as the addition polymers of monoethylenically unsaturated compounds, e.g. polystyrene, sulfonated polymers that contain an average of about 0.5 or more sulfonic acid group per molecule or monomeric compound chemically combined in the polymer are usually at least extensively swellable or even dispersible or soluble in water, the extent of such water-swellability or dispersibility being at least in part determined by the extent to which a cross-linking reaction has occurred during the sulfonation. In highly sulfonated reaction products from starting polymers that are substantially linear, an increase in the degree of sulfonation cross-linking (e.g. formation of sulfone linkages between polymer molecules) is manifested first as an increase in the thickening power of the water-swellable sulfonate in water. As the degree of cross-linking is further increased, the sulfonated polymer becomes less swellable by water and its thickening power diminishes. In general, lower concentrations of sulfonation agent in the starting gas stream, and/or lower temperatures in the reaction zone lead to lower degrees of formation of crosslinkages during the sulfonation reaction, whereas, conversely, higher concentrations of sulfonation agent in the starting gas stream and/or higher temperatures in the reaction zone lead to higher degrees of formation of crosslinkages during the sulfonation reaction.

Useful products are obtained by this process. For example, the water-swellable resin sulfonates are useful thickeners for aqueous media. The highly crosslinked resin sulfonates are useful cation exchangers. The sulfonic acid groups in the sulfonated products can be converted to other groups in known manner, e.g. to sulfonate salt groups by reaction with alkalies such as alkali hydroxides, ammonia and amines.

A novel kind of product having unusual and advantageous properties has been obtained by this process and is referred to as "microgel." These microgel products are small spheroids having an average diameter of 10 microns or less and having an appreciable degree of sulfonation coupled with an appreciable degree of cross-linking to an extent such that the individual sulfonated resin particles are swellable by water but are not disintegrated thereby. Such particles, when dispersed in water or other aqueous media, may become greatly distended but retain their individual identities.

An unusual and advantageous property of some of these microgels is characterized by a delayed development of maximum viscosity when dispersed in water. Microgels of this kind when first dispersed as anhydrous particles in water or other aqueous media cause little if any increase in viscosity of the composition. Upon being allowed to stand, the microgels swell and cause the viscosity of the dispersion to increase until an equilibrium condition is reached. The rate and extent of such viscosity change can be increased by raising the temperature. This provides unique utility in a sulfonated resin thickening agent which permits a lower viscosity aqueous composition at a lower temperature to be converted to one having a higher viscosity at a higher temperature.

Another unusual and advantageous property of these microgels is manifested in dispersions in water or other aqueous media as stability to shear. Ordinary aqueous media thickened with the conventional resin sulfonate thickeners are sensitive to shear, that is, the viscosity of such thickened compositions is decreased by subjecting such compositions to shear forces such as are encountered by stirring or pumping operations. Aqueous media thickened with the new microgel resin sulfonates are stable to such shear forces. A plausible explanation for this unexpected difference may be that conventional resin sulfonate thickeners in aqueous media are three dimensional networks of long and entangled chains while the new microgels are discrete particles. When aqueous media thickened with the former are subjected to shear, e.g. by a stirrer, the long and entangled chains are ripped apart, ruptured and shortened, whereby the viscosity of the aqueous composition is decreased. In contrast, when aqueous media thickened with the new microgels are subjected to shear, e.g. by a stirrer, the microgels merely move out of the way and, since no appreciable change is worked on the structure of the microgel, the viscosity of the aqueous composition is not changed. The microgels are uniquely useful in providing thickened aqueous media that are stable to shear and that can be stirred or pumped without substantial change in viscosity resulting from such action.

The following examples illustrate the invention, but are not to be construed as limiting its scope.

EXAMPLE 1

An aqueous colloidal dispersion of a resinous polymer was spray-dried to provide a finely divided, anhydrous solid material for sulfonation. The colloidal solid particles in the aqueous dispersion had an average diameter of 0.196 micron and were obtained by emulsion polymerization in conventional manner of a mixture of monomers containing 4 percent by weight acrylonitrile and 96 percent by weight of a mixture of isomeric vinyltoluenes in proportions corresponding to approximately 60 parts by weight of m-vinyltoluene and approximately 40 parts by weight of p-vinyltoluene. The copolymer product was soluble in toluene and a solution of the copolymer in nine times its weight of toluene had a viscosity of 40 centipoises at 25° C.

A 136-gram portion of the finely divided anhydrous solid copolymer was placed in a reactor vessel equipped with a slow-moving paddle agitator for turning over the powdery solid. A stream of sulfur trioxide-containing gas was provided by feeding to a heated vaporizer at a rate of 8 pounds per hour a liquid mixture containing 1.60 mole percent sulfur trioxide and 98.40 mole percent sulfur dioxide. The vapors from the vaporizer were led into the mass of dry polymer particles to effect the sulfonation reaction. During the sulfonation reaction the temperature in the reactor was approximately 55° C. and the pressure was substantially atmospheric. The operation was continued for one hour.

The sulfonated product was a dry, finely divided polymer solid that resembled the polymer starting material in appearance. A sample of the resin sulfonate was extracted with diethyl ether (to remove any occluded inorganic acid) and a portion of the purified resin sulfonate was dispersed in water and titrated with standard alkali. One gram of the resin sulfonate required 4.2 ml. of 1.0 N sodium hydroxide solution to effect neutralization.

Dispersions of the resin sulfonate microgel in water were made, heated briefly to 90° C., and cooled to room temperature. The viscosities of these dispersions were then measured on a Brookfield recording viscometer using a T-spindle describing a helical path through the dispersion. The viscosity values, in centipoises, so determined for dispersion of various concentrations of the microgel are shown below.

| Concentration of Microgel dispersion, Percent by weight | Viscosity of Dispersion, Centipoises |
| --- | --- |
| 0.8 | 85 |
| 1.0 | 533 |
| 1.3 | 6,500 |
| 1.5 | 15,560 |
| 2.0 | 95,500 |
| 2.5 | >166,000 |

These dispersions were stable to shear, i.e. their viscosity values remained constant during agitation by stirring.

An aqueous dispersion of 2.0 percent by weight of the microgel when heated to 90° C. for 1.5 hours and cooled to 30° C. had an initial viscosity of 133,000 centipoises by the described method. The gel was excessively swollen due to its high temperature treatment. Upon standing at room temperature for several weeks, its viscosity value dropped, asymptotically approaching a stable viscosity value of approximately 100,000 centipoises. A similar 2.0 percent by weight dispersion of the microgel without any heat treatment (dispersion made at room temperature) had an initial viscosity value of approximately 28,000. Upon standing for several weeks at room temperature, the viscosity of the dispersion increased, asymptotically approaching a stable viscosity value of approximately 100,000 centipoises. The microgel particles were substantially cross-linked and, although extensively swollen in water, retained their individual identities in the aqueous dispersions.

The procedure of Example 1 was repeated using, in place of the $SO_3$—$SO_2$ gas mixture, a gas mixture of $SO_3$ in nitrogen containing 1.6 mole percent $SO_3$, and substantially the same results were obtained.

EXAMPLE 2

In a manner similar to that described in Example 1, various kinds of starting polymers were sulfonated with a gas mixture of sulfur trioxide and sulfur dioxide and under a variety of conditions. These data are summarized in Table I together with the properties of the sulfonate microgel. All of these products were cross-linked sulfonates. The individual particles were swellable by water but retained their identities when so swollen. The sulfonate from polystyrene in test 6 was only slightly swollen in water and had very little effect on the viscosity of the dispersion.

Table I

| Test | Polymer [1] | Particle Size, Microns | Polymer Viscosity [2] | $SO_3$ in Mixture, Mole Percent | Time of Reaction, Hours | Temperature, °C. | Microgel Titration [3] | Microgel Vis. Wt. Percent | Microgel Vis. Cps. |
| --- | --- | --- | --- | --- | --- | --- | --- | --- | --- |
| 1 | VT—4% VCN | 0.196 | 40 | 3.22 | 0.5 | 69 | 4.0 | 1.5 | 50,000 |
| | | | | | | | | 2.0 | 121,000 |
| 2 | VT | 0.24 | 51.5 | 1.60 | 1.0 | 47 | 4.2 | 1.0 | 46 |
| | | | | | | | | 1.2 | 290 |
| | | | | | | | | 1.5 | 1,070 |
| | | | | | | | | 2.0 | 16,300 |
| | | | | | | | | 2.8 | 96,400 |
| | | | | | | | | 3.0 | 132,800 |
| 3 | VT | 0.637 | 30.7 | 3.22 | 0.5 | 55 | 4.3 | 3.0 | 22,500 |
| | | | | | | | | 3.5 | 70,000 |
| 4 | VT | 0.110 | >95,000 | 1.60 | 1.0 | 43 | 4.5 | 2.5 | 36,500 |
| | | | | | | | | 3.0 | 98,800 |
| | | | | | | | | 3.5 | >166,000 |
| 5 | VT—0.06% DVB | 0.470 | 5,000 | 1.60 | 1.0 | 40 | 4.1 | 3.0 | 19,150 |
| | | | | | | | | 3.5 | 103,000 |
| 6 | PS | 0.454 | 67.9 | 1.60 | 1.5 | 50 | 4.3 | 2.0 | 5 |
| | | | | | | | | 3.5 | 6 |

Notes:
[1] VT=vinyltoluene, a mixture of approximately 60 percent by weight m-vinyltoluene and 40 percent p-vinyltoluene; VCN= acrylonitrile. DVB=divinylbenzene, a mixture of isomers. PS=polystyrene.
[2] Viscosity in centipoises at 25° C. of a solution of the polymer in 9 times its weight of toluene.
[3] Titration in ml. of 1.0 N NaOH required to neutralize 1.0 gram of dry ether-extracted sulfonate in water dispersion. The percentages are by weight.

EXAMPLE 3

In a manner similar to that described in Example 1, 100-gram portions of polymer were sulfonated with mixtures of sulfur trioxide and nitrogen of various concentrations of $SO_3$ as set forth in Table II.

The polymer was a copolymer of approximately 96 percent by weight of vinyltoluene (a mixture of approximately 60 percent by weight meta-vinyltoluene and 40 percent paravinyltoluene) and 4 percent by weight acrylonitrile, in particles having an average diameter of 0.17 micron, whose solution in nine times its weight of toluene had a viscosity of 23.4 centipoises at 25° C.

The sulfonation was carried out by vaporizing liquid $SO_3$ at a controlled rate, blending the vaporous $SO_3$ with dry nitrogen fed at a controlled rate, and passing the resulting gas mixture through a slowly agitated bed of the polymer powder for 1.2 hours. The titration values given for the microgel product are the volumes in milliliters of 1.0 N NaOH solution required to neutralize 1.0-gram samples of the ether-extracted dry sulfonates when dispersed in water. The viscosity of the microgel is the viscosity, determined in the manner described in Example 1, of a 2 percent by weight dispersion of the microgel in water.

These data are shown in Table II. All of the microgels were substantially cross-linked and the microgel particles retained their individual identities even when highly swollen with water. Those products which, at any particular concentration, gave dispersions in water that had the lower viscosity values were the more cross-linked and less swellable products.

passing a gas mixture containing 15 mole percent sulfur trioxide in nitrogen, at a rate corresponding to 0.96 gram of $SO_3$ per minute, into a bed of the polymer particles at temperatures in the range between 30° and 50° C. for 1.75 hours. A portion of the sulfonate product was extracted with ether and dried. One gram of the ether-extracted dry polymer dispersed in water required 2.8 ml. of 1 N NaOH solution for neutralization. The viscosity of a 2 percent by weight dispersion of the sulfonate product in water at 25° C. was 3.5 centipoises.

EXAMPLE 6

A 75-gram portion of the vinyltoluene polymer described as the starting material in Example 4 was sulfonated with vapors of chlorosulfonic acid. The operation was carried out by vaporizing chlorosulfonic acid in a heated vessel at a rate of 0.5 ml. of liquid chlorosulfonic acid per minute and sweeping the chlorosulfonic acid vapors from the vaporizer vessel with a stream of nitrogen at a rate to make a gas mixture containing approximately 15 mole percent chlorosulfonic acid. The resulting gas mixture was fed into a bed of the polymer particles at room temperature for 50 minutes. The resin sulfonate was extracted with ether and dried. The elemental analyses on the dry product were as follows:

| | Percent by weight |
|---|---|
| Sulfur | 3.69 |
| Chlorine | 0.18 |

One gram of the sulfonated resin, dispersed in water, required 1.15 ml. of 1 N NaOH solution for neutralization.

Table II

| Test | $SO_3$, Rate of Feed, gm./min. | $SO_3$ in Nitrogen Mixture, Mole percent | Temperature of Polymer Bed at Start, ° C. | Microgel Titration | Microgel Viscosity, cps. 2% Dispersion |
|---|---|---|---|---|---|
| 1 | 1.19 | 15.6 | 25 | 4.2 | 58,100 |
| 2 | 1.19 | 25 | 25 | 4.0 | 56,500 |
| 3 | 1.19 | 35 | 25 | 4.2 | 29,000 |
| 4 | 1.19 | 50 | 25 | 3.6 | 23,600 |
| 5 (Note 1) | 1.40 | 75 | 40 | 4.8 | 12,750 |
| 6 | 1.19 | 5.25 | 65 | 3.8 | 34,600 |
| 7 | 1.19 | 35 | 65 | 4.2 | 7,830 |
| 8 | 1.19 | 50 | 65 | 4.4 | 7,800 |
| 9 (Note 2) | 1.19 | 5.25 | 25 | 3.6 | 1,330 |
| 10 (Note 2) | 1.19 | 5.25 | 70 | 3.4 | 400 |

Notes:
1. Sulfonation time 1.0 hour.
2. $BF_3$ catalyst added to $SO_3$—$N_2$ gas stream at rate of 30 grams of $BF_3$ per hour.

EXAMPLE 4

A spray-dried, emulsion polymerized polymer of vinyltoluene (approximately 60 percent by weight meta-vinyltoluene and 40 percent para-vinyltoluene) having particles whose average diameter was 0.24 micron, and whose solution in nine times its weight of toluene had a viscosity of 29.2 centipoises at 25° C., was sulfonated with 100 percent sulfur trioxide gas. The operation was carried out by vaporizing sulfur trioxide and conducting the vapors through a bed of the polymer particles in a reactor under a pressure of from 20 to 30 mm. of mercury, absolute pressure and at a polymer bed temperature of from 40° to 50° C. A portion of the sulfonate product was extracted with ether and dried. This sample required 5.0 ml. of 1.0 N NaOH to neutralize 1.0 gram of the dry sulfonate in water dispersion. The viscosity at 25° C. of a 2 percent by weight dispersion of the microgel in water was 2000 centipoises.

EXAMPLE 5

A 100-gram portion of polyvinyltoluene (a polymer of approximately 60 percent by weight meta-vinyltoluene and 40 percent para-vinyltoluene), having particles whose diameters were in the range from 10 to 20 microns, and whose solution in nine times its weight of toluene had a viscosity of 10 centipoises at 25° C., was sulfonated by

EXAMPLE 7

An aqueous grinding composition was compounded as follows. Two parts by weight of a microgel sulfonate was dispersed in water, heated to 92° C. for 35 minutes, and cooled to 35° C. The microgel sulfonate was one made by sulfonation of a copolymer of 96 percent by weight of vinyltoluene (a mixture of approximately 60 percent by weight m-vinyltoluene and 40 percent p-vinyltoluene) and 4 percent by weight of acrylonitrile. The starting copolymer was one whose solution in nine times its weight of toluene had a viscosity of 40 centipoises at 25° C. and was in the form of small solid particles whose average diameter was 0.196 micron. The viscosity of the aqueous dispersion of the sulfonate microgel thereby obtained was 350 centipoises at 35° C.

To this 100 parts by weight of aqueous dispersion of sulfonate microgel, there was added 43 parts by weight of grit No. 320 silicon carbide grains. The grinding grits dispersed readily in the microgel dispersion and no appreciable settling out was observed on standing.

The resulting grinding composition was employed between a horizontally rotating tapered male brass mandrel and a correspondingly tapered female glass tube. No seizure or scoring of the parts was observed. The grinding composition was well distributed and retained between the mandrel and the surrounding glass part.

We claim:

1. A method which comprises contacting solid particles of a resinous polymer of an alkenylaromatic hydrocarbon, which particles have diameters not greater than 25 microns, with a body of gas comprising at least one sulfonation agent selected from the group consisting of sulfur trioxide and chlorosulfonic acid and maintaining such solid particles of polymer in contact with such gas at temperatures in the range from −40° C. to 200° C. when the sulfonation agent is sulfur trioxide and from 30° C. to 200° C. when the sulfonation agent is chlorosulfonic acid until the resinous polymer is appreciably sulfonated.

2. A method according to claim 1 wherein the polymer is a resinous polymer of a vinylbenzene hydrocarbon.

3. A method according to claim 1 wherein the reaction temperature is maintained at from 0° to 100° C. when the sulfonation agent is sulfur trioxde and from 30° C. to 100° C. when the sulfonation agent is chlorosulfonic acid.

4. A method according to claim 1 wherein the sulfonation agent is sulfur trioxide.

5. A method for making resin sulfonates which comprises contacting solid particles of a resinous polymer of a vinyl benzene hydrocarbon, which particles have diameters not greater than 10 microns, with a body of gas comprising sulfur trioxide and maintaining contact between the solid particles of polymer and the sulfur trioxide-containing gas at temperatures of from 0° to 100° C. until the polymer is substantially sulfonated.

References Cited in the file of this patent

UNITED STATES PATENTS

| | | |
|---|---|---|
| 1,835,404 | Kalischer | Dec. 8, 1931 |
| 2,235,971 | Wilson | Mar. 25, 1941 |
| 2,280,802 | Depew | Apr. 28, 1942 |
| 2,523,582 | Mattson | Sept. 26, 1950 |
| 2,604,461 | Roth | July 22, 1952 |
| 2,746,938 | Ehm et al. | May 22, 1956 |